(12) United States Patent
Horenstein

(10) Patent No.: US 7,385,268 B2
(45) Date of Patent: Jun. 10, 2008

(54) METHOD FOR LINEARIZING DEFLECTION OF A MEMS DEVICE USING BINARY ELECTRODES AND VOLTAGE MODULATION

(75) Inventor: Mark N. Horenstein, West Roxbury, MA (US)

(73) Assignee: Trustees of Boston University, Boston, MA (US)

( * ) Notice: Subject to any disclaimer, the term of this patent is extended or adjusted under 35 U.S.C. 154(b) by 230 days.

(21) Appl. No.: 10/506,654

(22) PCT Filed: Mar. 10, 2003

(86) PCT No.: PCT/US03/07123

§ 371 (c)(1),
(2), (4) Date: Sep. 3, 2004

(87) PCT Pub. No.: WO03/077286

PCT Pub. Date: Sep. 18, 2003

(65) Prior Publication Data

US 2005/0152014 A1    Jul. 14, 2005

(51) Int. Cl.
*H01L 29/82* (2006.01)
(52) U.S. Cl. .................. 257/415; 257/254; 359/223; 359/224

(58) Field of Classification Search ............... 257/254, 257/415; 359/223, 224
See application file for complete search history.

(56) References Cited

U.S. PATENT DOCUMENTS

| | | | |
|---|---|---|---|
| 6,215,579 B1 * | 4/2001 | Bloom et al. | 359/298 |
| 6,498,870 B1 | 12/2002 | Wu et al. | 385/18 |
| 2004/0058469 A1 * | 3/2004 | Kowarz | 438/50 |

* cited by examiner

*Primary Examiner*—Thomas Dickey
*Assistant Examiner*—Tan Tran
(74) *Attorney, Agent, or Firm*—Weingarten, Schurgin, Gagnebin & Lebovici LLP

(57) ABSTRACT

A micromechanical device comprising one or more electronically movable structure sets comprising for each set a first electrode supported on a substrate and a second electrode supported substantially parallel from said first electrode. Said second electrode is movable with respect to said first electrode whereby an electric potential applied between said first and second electrodes causing said second electrode to move relative to said first electrode a distance X, (X), where X is a nonlinear function of said potential, (V). Means are provided for linearizing the relationship between V and X.

29 Claims, 4 Drawing Sheets

US 7,385,268 B2

METHOD FOR LINEARIZING DEFLECTION OF A MEMS DEVICE USING BINARY ELECTRODES AND VOLTAGE MODULATION

STATEMENT REGARDING FEDERALLY SPONSORED RESEARCH OR DEVELOPMENT

This invention was made with Government Support under Contract Number W-7405-ENG-48 awarded by the Department of Energy. The Government has certain rights in the invention.

CROSS REFERENCE TO RELATED APPLICATIONS

The present invention claims priority to U.S. Provisional Application Ser. No. 60/363,139 commonly owned with the application.

BACKGROUND OF THE INVENTION

Among the applications for micromechanical devices are planar actuators comprising one or typically an array of actuators in a two-dimensional matrix in which individual elements of the array need to be individually and rapidly displaced.

In one application of such actuators to the deflection of radiation, an array of actuators includes mirrors activated by micromechanical electrostatic motivators to provide rapid displacement of the mirror positions in the array in order to alter the phase delay of incoming radiation wavefronts and thereby adjust the phase of the reflected light or the angle of reflection.

In modern high-speed systems such as scanners and pattern recognition systems, the demands for rapid adjustment of the phase of reflected light or beam angle continue to increase, placing severe demands upon control circuitry for an array of large dimensions to precisely and individually control each of hundreds or thousands of mirror elements in the array.

An additional problem encountered in controlling such actuators is the nonlinearity between displacement and applied control voltage due to the mathematical relationship between displacement and applied potential in what is essentially a parallel-plate capacitor geometry. To deal with the nonlinearity in order to provide accurate beam reflection, a heavy demand is placed upon processing electronics to accomplish any adjustment to the hundreds or thousands of individual actuators for controlling the position on an ongoing, rapid sequence basis.

BRIEF SUMMARY OF THE INVENTION

The present invention provides for an effective way of linearizing the response between desired position and applied potential that takes advantage of and places structured designs directly into the micromechanical structure. It is operative directly in response to digital signals, avoiding the complexity and delay of looped processing to accomplish the mathematical linearization.

According to the present invention, at least one electrode of each of the parallel plate actuator elements is divided into a plurality of electrode segments of varying area, from a minimum first area to a maximum, nth area of greatest value, through a plurality of areas increasing from one to the other by a factor of two. Each of the electrode segments is individually addressed through voltage gates that are controlled by binary ones and zeroes directly representative of the applied voltage potential. The resulting nonlinear transfer function that relates the applied potential to the effective displacement caused by the applied potential counteracts some or all of the nonlinearity in the relationship or transfer function between applied potential and actuator displacement.

The nonlinearity in the transfer characteristic between applied potential and actuator displacement is completely eliminated by adjusting the applied voltage that is applied to each of the electrode segments through the use of a plurality of current sources each of magnitude varying from a low minimum first magnitude corresponding to and activated with activation of the first electrode segment and varying, one to the other, by factor of two up to the largest or nth current source, corresponding to and activated simultaneously with activation of the largest or nth electrode segment.

The resulting system utilizes a simple structure not requiring time-consuming electronic processing of the applied potential in order to produce a linear relationship between displacement and input value, but nevertheless linearizing its relationship with respect to the displacement value it causes.

BRIEF DESCRIPTION OF THE DRAWINGS

The present invention is more fully understood with respect to the drawings of which.

DETAILED DESCRIPTION

Figure 1A:
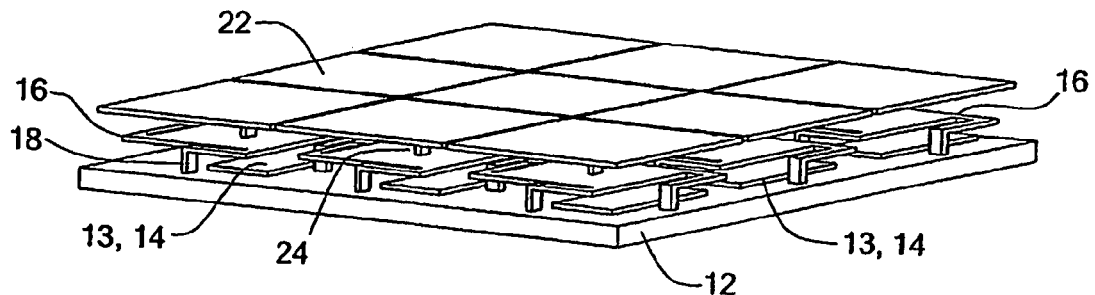
FIGS. 1A and 1B are perspective views of first and second examples of a planar actuator of the type to which the present invention is applied.
Figure 1B:
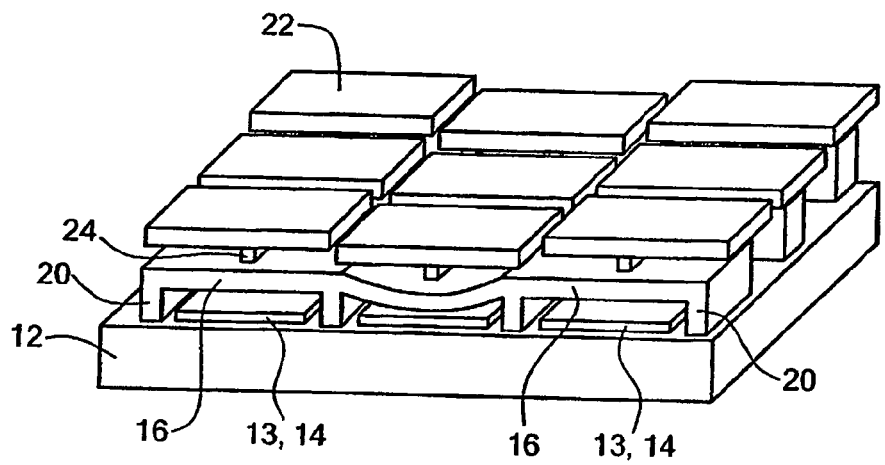

FIGS. 1A and 1B illustrate planar arrays of actuators typical of those in which the present invention is operative. Each array includes a substrate 12 having thereon electrodes 14 on an insulating layer 13. In typical micromechanical versions of the arrays, the substrate 12 is silicon, the insulating layer 13 silicon nitride, and electrodes 14 may be either metalizations or conductive diffusions, each with appropriate leads, typically metalizations, not shown to apply potential thereto. Above the substrate 12 a plurality of second electrodes 16 are supported by legs 18 in the case of FIG. 1A or monolithic structures 20 in the case of FIG. 1B. In the case of FIG. 1A, the electrodes 14 may be commonly connected whereas the second electrodes 16 are individually metallized and connected by supports 18 to individual circuit leads. In the case of FIG. 1B, the first electrodes 14 will typically be individually connected to circuit leads while the electrodes 16 are commonly connected to a single lead.

A reflective surface 22 is fastened above the second electrodes 16 via posts 24 in both versions of FIGS. 1A and 1B.

Figure 2:
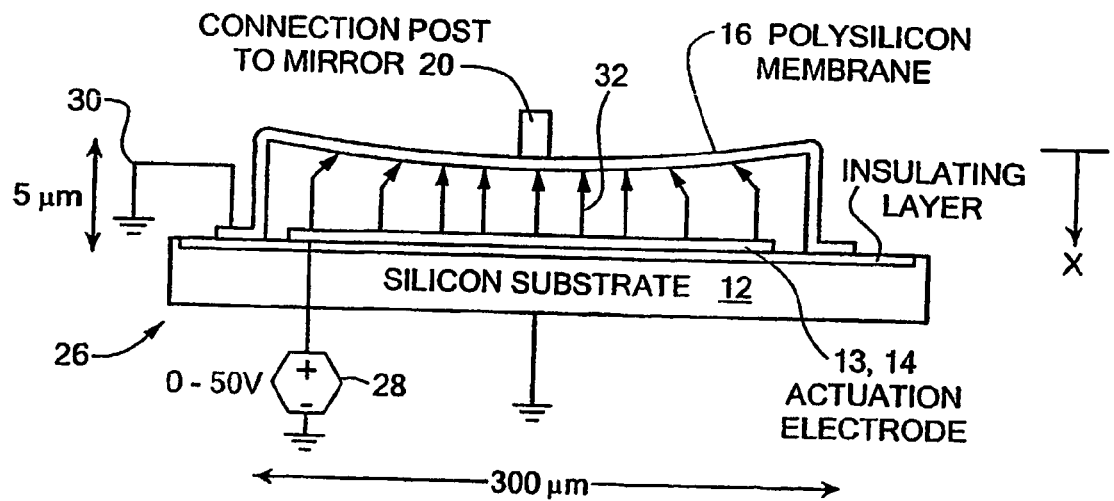
FIG. 2 is a schematic diagram of a single element of an actuator array of the type illustrated in FIGS. 1A and 1B.

FIG. 2 illustrates in cross-section a single actuator 26 from the planar array illustrated in FIG. 1B. In this case, the bottom electrodes 14 are individually connected through leads not shown to individually controlled sources of potential, such as the exemplary voltage source 28, while the second, upper electrodes 16 are connected in common through supports 20, typically to ground 30. The dimensions illustrated in FIG. 2 are exemplary only to identify the scale of the structures of micromechanical devices of this type and are not to be seen as limiting.

Figure 3A:
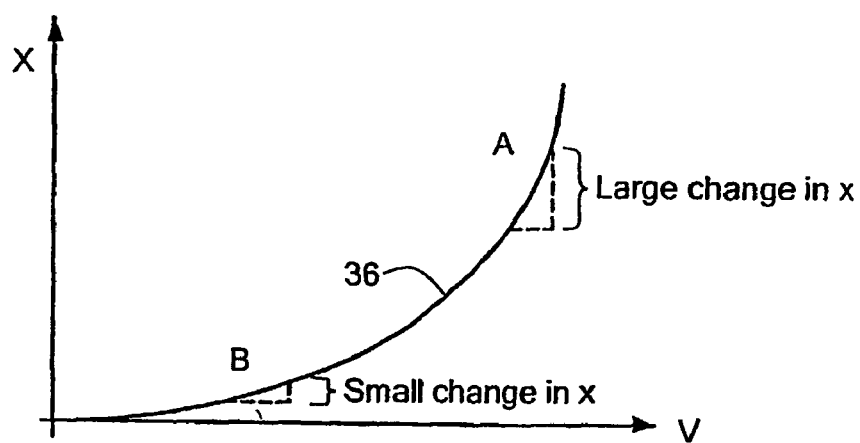
FIGS. 3A and 3B are graphs representing the transfer function between the desired deflection represented by either a voltage or a digital number versus the actual displacement in an actuator of the type illustrated in FIG. 2, being respectively nonlinear and linearized transfer functions.

The force created by the voltage source 28, shown only for purposes of illustration of operation of such activators, produces along illustrated electrostatic field lines 32 a force between the electrodes 14 and 16. As the voltage increases, the force increases, and the displacement in the direction X of the electrode 16 toward the electrode 32 increases. The relationship for such a structure is illustrated by the graph of FIG. 3A which shows a typical transfer function between applied voltage V and displacement X. The curve 36 representing that transfer function is dramatically nonlinear reflective of the fact that as the electrode 16 approaches the electrode 14, the force due to the applied voltage increases such that for every unit increase in applied voltage the resulting displacement becomes larger than the displacement for units at lower levels of applied voltage. Such a situation makes for a complication in the ability to accurately control, typically in an open loop function such as in an image processor, the reflected phase or angle of deflection of an incident light beam.

Figure 4:
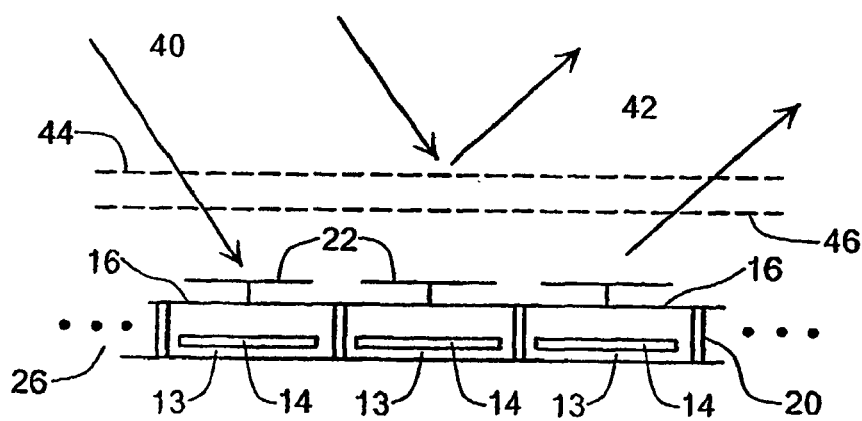
FIG. 4 is a diagram illustrating the operation of a planar array in reflecting the rays of a light beam.

FIG. 4 illustrates for such a typical array 26 the physics of light beam reflection. As shown in this example, an incident beam 40 of radiation is reflected by the reflective or mirror elements 22 creating an output beam 42. The input beam 40 has a wavefront 44 representing the locus of same phase radiation in the input beam 40. The output beam 42 has a wavefront 46 again representing a locus of identical phase in the output beam 42. In an unactivated situation the mirrors 22 lie in the same plane but diverge when activated by the application of a potential individually between the electrodes 14 and 16 of each actuator in array 26. Upon activation selectively of the mirrors 22 by applying respectively different voltages between the electrodes 14 and 16, the path length of the input beam and the output beam 42 can be varied over the entire area of the wavefront 44 delaying some sections relative to other sections which in turn causes the output beam wavefront 46 to be changed in phase resulting in a change in the phase of selected sections of the output beam itself.

Figure 3B:
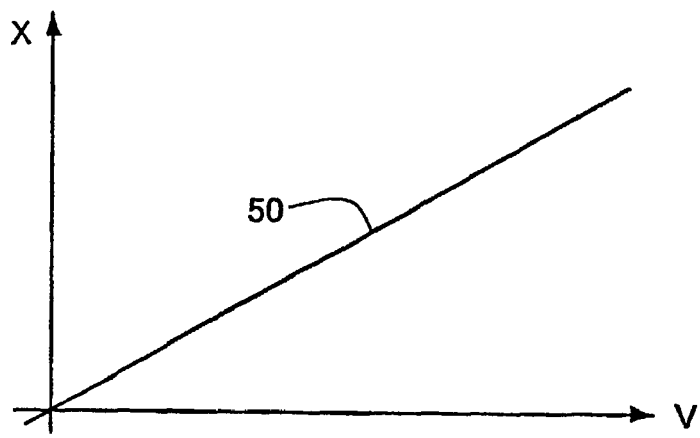

In order to change or steer the input beam 40 onto different trajectories for output beams 42 it is essential that a progressive change in displacement occur over the entire array of mirrors 22. To accomplish that accurately with the transfer function illustrated in FIG. 3A requires an enormously complex processing scheme if it is done electronically before the application of the individual voltages V between the electrodes 14 and 16. The present invention linearizes the effect of the applied voltage such that a transfer function between a digital number representing the desired deflection and the actual displacement 50 as illustrated in FIG. 3B is achieved. This is accomplished using a circuit of the type shown in FIG. 5 which can be substantially integral with the micromechanical structure and thus does not require time-consuming electronic processing that would reduce the response speed of the structure.

Figure 5:
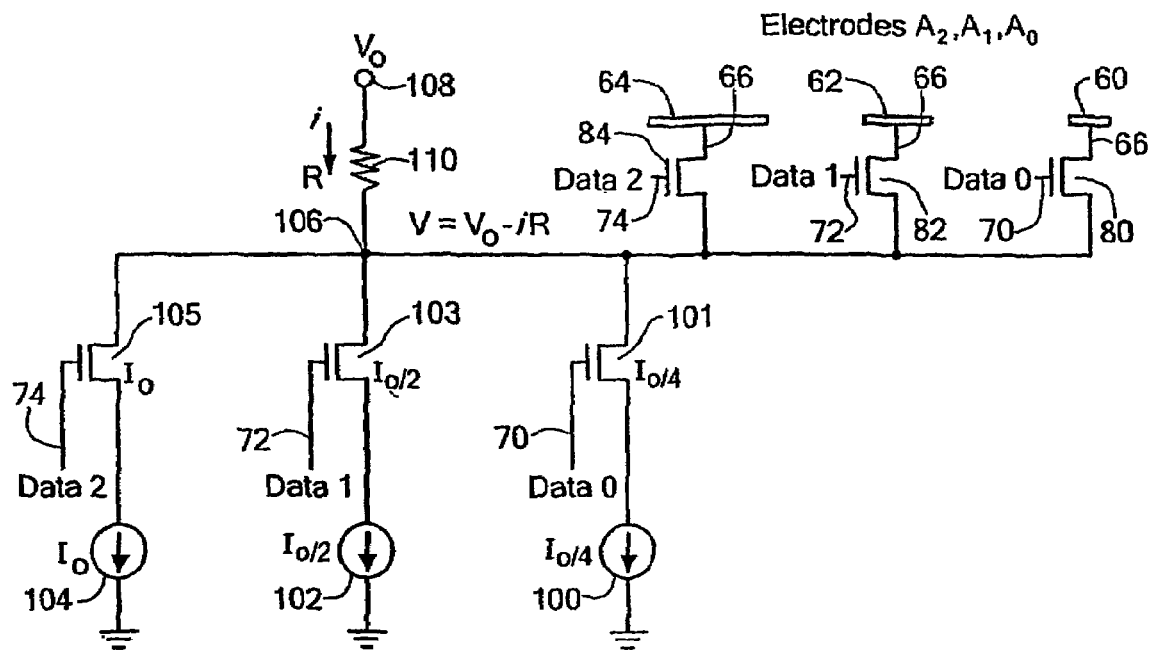
FIG. 5 is a schematic diagram illustrating a circuit according to the invention for controlling individual actuator elements of a planar activator array.

As illustrated in FIG. 5, each of the electrodes 14 is segmented into a plurality of electrode segments 60, 62 . . . 64 each of increasing area with a ratio of increase between each successively larger segment being a factor of two, from the smallest, first electrode segment 60 to the largest, nth electrode segment 64. While FIG. 5 illustrates only three electrode segments 60-64 it is to be understood in the application of the invention to a real structure there could be a larger number of electrode segments depending upon the desired resolution and the acceptable expense for the array and distribution circuitry to convert the incoming voltage, typically in digital binary form to separate ones and zeroes for each electrode segment 60-64 application lead 66. Each lead 66 is fed with a signal from corresponding data lines 70, 72 and 74. For example, if an 8-bit data word or byte is used, representing 256 possible data states or voltage levels, there will be eight electrode segments 60-64 and corresponding data leads 70-74 corresponding to the individual zero and one bit positions in the data word. By activating a select combination of the electrode segments it is possible to achieve the corresponding voltage effect in 256 resolution steps. The digital ones and zeroes operate through control switches 80, 82 and 84 which may be integral to the structure. The digital ones and zeroes representing the desired deflection of said actuator 20 are carried on input lines 70,72,74 and are obtained from the output of a digital control device such as a computer, microprocessor, microcontroller, or logic circuit. The number of digital bits of said digital signal corresponds to the number of electrodes 60-64 included in the system. Each of the switches 80-92 is activated by one digital line 70,72,74 of the digital signal, with the line 70 corresponding to the least significant bit (LSB) connected to the switch 80 and, in turn, the electrode segment of smallest area, and the line 74 corresponding to the most significant bit (MSB) connected to the switch 84 and, in turn, the nth electrode segment of largest area.

Figure 6:
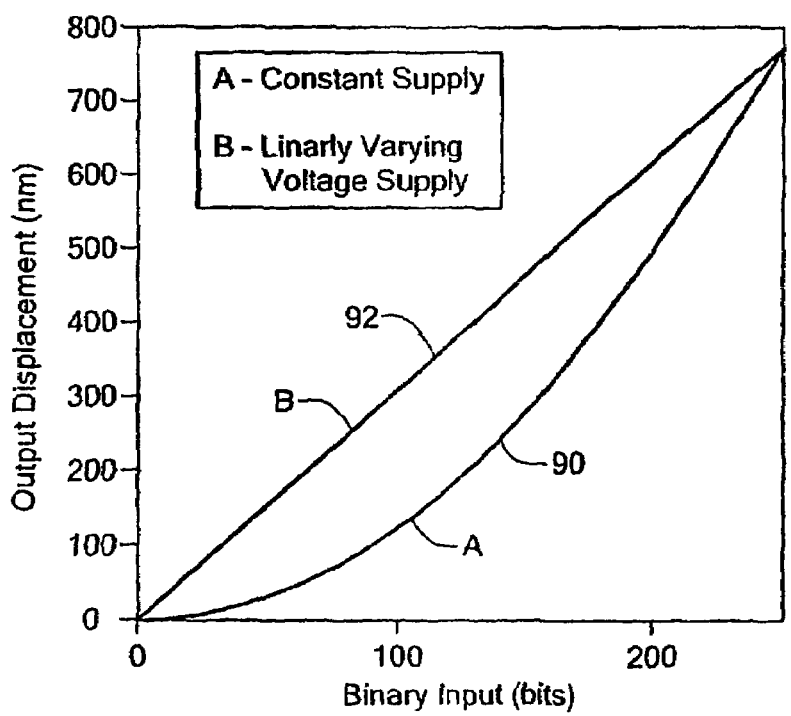
FIG. 6 illustrates the linearization of the transfer function relating the digital input signal and the displacement.

The effect of the linearization achieved through the use of switches 80-84 is to linearize the transfer function illustrated in FIG. 3A to the form illustrated by curve 90 in FIG. 6. This is linearized to the extent that the curve is substantially flattened and can be adjusted to have end points fitted to the end points of a fully linearized transfer function illustrated by curve 92.

To achieve a linearization corresponding to the curve 92 an adjustment in the reference voltage corresponding to the same digital word is provided by applying a varying load in the form of current sources 100, 102 and 104, connected via switches 101, 103, and 105 to a junction point 106 common with the application of voltage $V_o$ from a source 108 through a resistor 110. The sources 100, 102, 104 are connected to the common junction point 106 by switches 101, 103, and 103 controlled through the same digital lines controlling the switches 80-84. The magnitude of the current of each current source increases according to a series from a first current of lowest value corresponding to the LSB and the smallest electrode segment, increasing by a factor of two from current source to current source to the largest, nth current source corresponding to the MSB and largest area electrode segment. In this manner, a total linearization of the transfer function as illustrated in curve 92 can be achieved.

The mathematics corresponding to this linearization operate as follows:

Mechanical restoring force for a given displacement of the actuator electrode:

$$F_M = -kx \qquad (1)$$

where k is a mechanical spring constant and x the displacement.

Electrostatic force for a given applied voltage:

$$F_E = \frac{\varepsilon A_{TOT} V^2}{2(g-x)^2} \qquad (2)$$

where g is the spacing between electrodes 14 and 16 at zero applied voltage, $A_{TOT}$ their area of overlap as seen from a view perpendicular to the surface, and $\varepsilon$ a physical constant called the permittivity.

Equilibrium occurs when $F_M + F_E = 0$:

$$kx = \frac{\varepsilon A_{TOT} V^2}{2(g-x)^2} \text{ or } 2kx(g-x)^2 = \varepsilon A_{TOT} V^2 \qquad (3)$$

Define a constant $C = 2k/\varepsilon$, so that the above becomes:

$$Cx(g-x)^2 = A_{TOT} V^2 \qquad (4)$$

In one application of Eq. (4), one can keep the voltage V constant and adjust the area $A_{TOT}$ by activating only some subset of the electrode segments $A_n$. In such a case, solving Eq. (4) for the required $A_{TOT}$ as a function of desired displacement x results in $$A_{TOT} = \frac{C}{V^2} x(g-x)^2 = \frac{C}{V^2} [x^3 - 2gx^2 + g^2 x] \qquad (5)$$

This relationship is nonlinear and is undesirable for the reasons described previously. A desirable condition is one in which the displacement x is linearly proportional to the activation area $A_{TOT}$, i.e., dx/dA, and therefore dA/dx, are constant. Taking the derivative of Eq. (5) with respect to x leads to $$\frac{dA}{dx} = \frac{C}{V^2} [3x^2 - 4gx + g^2] \qquad (6)$$

Taking this equation's reciprocal results in:

$$\frac{dx}{dA} = \frac{V^2}{C(3x^2 - 4gx + g^2)} \qquad (7)$$

One can then impose the additional constraint that V also be a function of the desired displacement x. Specifically, let $V(x) = V_o(g-x)/g$, where $V_o$ is the value of V at zero displacement, and where V is reduced as x approaches in value that of the gap spacing, g. The displacement equation, now a function of both area $A_{TOT}$ and applied voltage V(x), becomes:

$$A_{TOT} = \frac{C}{V^2} x(g-x)^2 = \frac{gC}{V_o^2(g-x)^2} x(g-x)^2 = \frac{gC}{V_o^2} x \qquad (8)$$

The displacement x then becomes $$x = \frac{V_o^2 A_{TOT}}{gC} \qquad (9)$$

Figure 7:
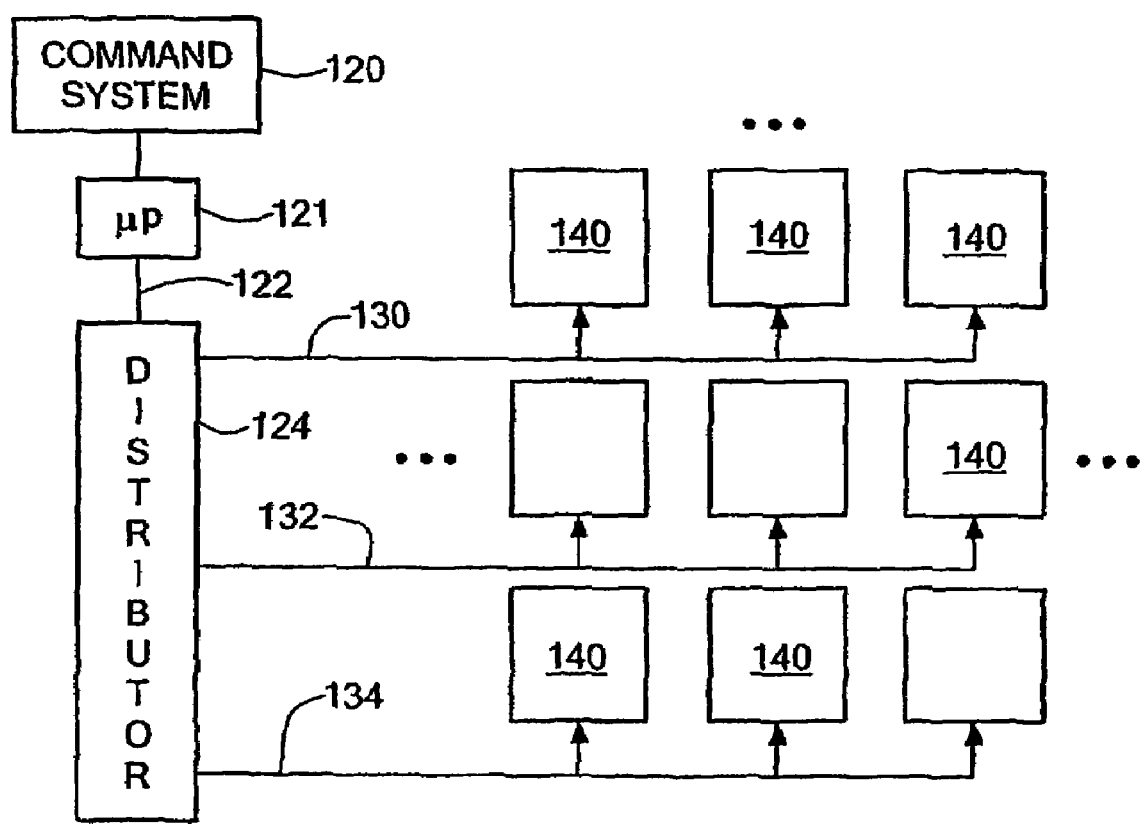
FIG. 7 is a diagrammatic illustration of a system for controlling a planar array using circuitry of the type illustrated in FIG. 5.

FIG. 7 illustrates an overall digital bit application system for use in the present invention. Voltage from a command system 120 is applied through and converted in a processor 121 which may be hard- or software operated, to apply a digital word 122 to a distribution system 124 which applies on busses 130, 132 . . . 134, voltages representing the binary bits 0 or 1 in some combination to individual actuators 140. The busses 130-134 will typically contain multiple leads for the individual electrode segments to be activated as illustrated above with respect to FIG. 5.

The above-described preferred embodiment is intended as exemplary only, the scope of the invention being described and limited only as shown in the following claims.

What is claimed is:

1. A micromechanical apparatus having one or more electronically adjustable structures comprising:
   a set having:
   a first electrode supported on a substrate;
   a second electrode supported substantially parallel from said first electrode, said second electrode being movable with respect to said first electrode,
   whereby an electric potential (V) applied between said first and second electrodes causes said second electrode to move toward said first electrode a distance X; where the distance X is a nonlinear function of said applied electric potential, and
   means for linearizing the non-linear relationship between V and X.

2. The apparatus of claim 1 wherein one of said first and second electrodes is divided into n plural separate electrode segments which increase from a first area over which said force results to a final larger, nth such area according to a predetermined geometric progression which offsets the non-linearization in said transfer function between X and V.

3. The apparatus of claim 2 wherein said nonlinear progression produces a doubling in the area between each segment from said first electrode segment area through each successive electrode segment to said nth electrode segment area thereby providing a second order adjustment in the transfer function between displacement X and applied potential V.

4. The apparatus of claim 3, wherein a plurality of sets of said first and second electrodes are arranged in a two-dimensional array.

5. The apparatus of claim 4 further comprising a reflective element supported by said second electrode substantially at a point of maximum deflection thereof in response to said applied potential.

6. The apparatus of claim 5 including drive means for applying a potential between first and second electrodes operative to reflect radiation over a range of angles corresponding to the deflection of each of said second electrodes in said array through phase delay wavefront steering.

7. The apparatus of claim 6 wherein said linearizing means further includes means for applying said potential, V, to selected ones of said electrode segments.

8. The apparatus of claim 7 wherein said means for linearizing includes means for varying the applied potential as a function of gap between said first and second electrodes.

9. The apparatus of claim 8 wherein said means for varying causes said potential to decrease as the spacing between said first and second electrodes decreases.

10. The apparatus of claim 9, further including means for varying the voltage applied to said electrode segments as a function of induced displacement comprising a plurality of current sources individually activated by digital signals synchronized to the activation of each of said plurality of segments, said current source increasing in magnitude from a first current level, corresponding to activation of said first electrode segment to an nth current level corresponding to activation of an nth electrode segment with each sequential current source differing from each other by a factor divisible by 2 in a monotonically increasing series from said first electrode segment associated current source to said nth electrode segment associated current source.

11. The apparatus of claim 6 wherein:
said drive means further includes means for applying said potential, V, to selected ones of said electrode segments; and
means for varying the voltage applied to said electrode segments are provided to increase the voltage between said first and second electrodes in synchronism with the application thereof to respective ones of said electrode segments.

12. The apparatus of claim 5 including means for applying a potential between said first and second electrodes operative to reflect radiation over a range of phase adjustments corresponding to the deflection of each of said second electrodes in said array through delayed phase reflection.

13. The apparatus of claim 12 wherein said linearizing means further includes means for applying said potential, V, to selected ones of said electrode segments.

14. The apparatus of claim 13 wherein said means for linearizing includes means for varying the applied potential as a function of gap between said first and second electrodes.

15. The apparatus of claim 14 wherein said means for varying causes said potential to decrease as the spacing between said first and second electrodes decreases.

16. The apparatus of claim 15, further including means for varying the voltage applied to said electrode segments as a function of induced displacement comprising a plurality of current sources individually activated by digital signals synchronized to the activation of each of said plurality of segments, said current source increasing in magnitude from a first current level, corresponding to activation of said first electrode segment to an nth current level corresponding to activation of an nth electrode segment with each sequential current source differing from each other by a factor divisible by 2 in a monotonically increasing series from said first electrode segment associated current source to said nth electrode segment associated current source.

17. The apparatus of claim 1, wherein a plurality of sets of said first and second electrodes are arranged in a two-dimensional array.

18. The apparatus of claim 1 further comprising a reflective element supported by said second electrode substantially at a point of maximum deflection thereof in response to said applied potential.

19. The apparatus of claim 18 including drive means for applying a potential between first and second electrodes operative to reflect radiation over a range of angles corresponding to the deflection of each of said second electrodes in said array through phase delay wavefront steering.

20. The apparatus of claim 19 wherein:
said drive means further includes means for applying said potential, V, to selected ones of said electrode segments; and
means for varying the voltage applied to said electrode segments are provided to increase the voltage between said first and second electrodes in synchronism with the application thereof to respective ones of said electrode segments.

21. The apparatus of claim 20 wherein said drive means includes means for controlling the application of said potential to each electrode segment according to states of digital bits of a digital signal.

22. The apparatus of claim 21, further including means for varying the voltage applied to said electrode segments as a function of induced displacement comprising a plurality of current sources individually activated by digital signals synchronized to the activation of each of said plurality of segments, said current source increasing in magnitude from a first current level, corresponding to activation of said first electrode segment to an nth current level corresponding to activation of an nth electrode segment with each sequential current source differing from each other by a factor divisible by 2 in a monotonically increasing series from said first electrode segment associated current source to said nth electrode segment associated current source.

23. The apparatus of claim 20, further including means for varying the voltage applied to said electrode segments as a function of induced displacement comprising a plurality of current sources individually activated by digital signals synchronized to the activation of each of said plurality of segments, said current source increasing in magnitude from a first current level, corresponding to activation of said first electrode segment to an nth current level corresponding to activation of an nth electrode segment with each sequential current source differing from each other by a factor divisible by 2 in a monotonically increasing series from said first electrode segment associated current source to said nth electrode segment associated current source.

24. The apparatus of claim 18 including means for applying a potential between said first and second electrodes operative to reflect radiation over a range of phase adjustments corresponding to the deflection of each of said second electrodes in said array through delayed phase reflection.

25. The apparatus of claim 1 wherein said linearizing means further includes means for applying said potential, V, to selected ones of said electrode segments.

26. The apparatus of claim 1 wherein said means for linearizing includes means for varying the applied potential as a function of gap between said first and second electrodes.

27. The apparatus of claim 26 wherein said means for varying causes said potential to decrease as the spacing between said first and second electrodes decreases.

28. The apparatus of claim 27, further including means for varying the voltage applied to said electrode segments as a function of induced displacement comprising a plurality of current sources individually activated by digital signals synchronized to the activation of each of said plurality of segments, said current source increasing in magnitude from a first current level, corresponding to activation of said first electrode segment to an nth current level corresponding to activation of an nth electrode segment with each sequential current source differing from each other by a factor divisible by 2 in a monotonically increasing series from said first electrode segment associated current source to said nth electrode segment associated current source.

29. A micromechanical apparatus having one or more electronically steerable structures comprising:
   a set having:
   a first electrode supported on a substrate;
   a second electrode supported substantially parallel from said first electrode, said second electrode being flexible with respect to said first electrode,
   whereby an electric potential (V) applied between said first and second electrodes causes said first and second electrodes to move relative to each other a distance X where the distance X is a nonlinear function of said applied electric potential; and
   means for linearizing the non-linear relationship between V and X.

* * * * *

UNITED STATES PATENT AND TRADEMARK OFFICE
CERTIFICATE OF CORRECTION

PATENT NO.         : 7,385,268 B2
APPLICATION NO. : 10/506654
DATED                 : June 10, 2008
INVENTOR(S)       : Mark N. Horenstein It is certified that error appears in the above-identified patent and that said Letters Patent is hereby corrected as shown below:

On the Title Pg, insert after Prior Publication section Item (60):
--Related U.S. Application Data
(60) Provisional Application No. 60/363,139, filed on March 8, 2002.--; and Column 1, delete lines 17-19 and insert, --This application is a 371 of PCT/US03/07123 filed March 10, 2003 and claims priority of US Provisional Application No. 60/363,139, filed March 8, 2002, entitled: METHOD FOR LINEARIZING DEFLECTION OF A MEMS DEVICE USING BINARY ELECTRODES AND VOLTAGE MODULATION.--.

Signed and Sealed this

Ninth Day of June, 2009

JOHN DOLL
*Acting Director of the United States Patent and Trademark Office*